Jan. 6, 1970     B. H. KAPNEK     3,487,746
SCREW ANCHOR
Filed April 1, 1968
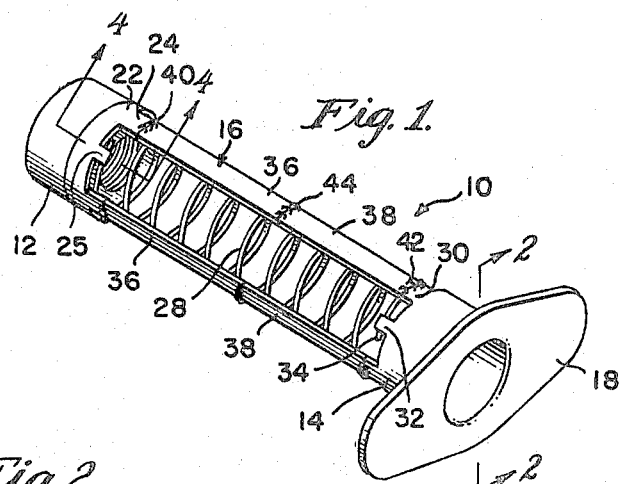
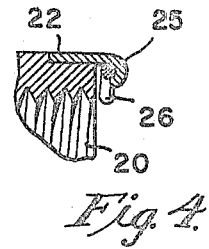
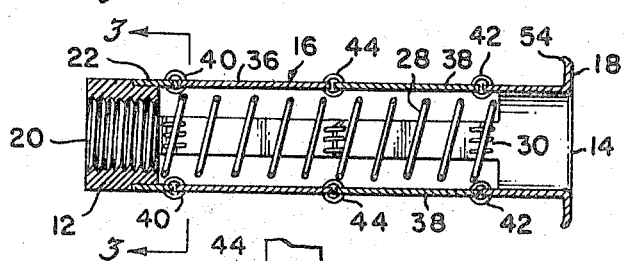
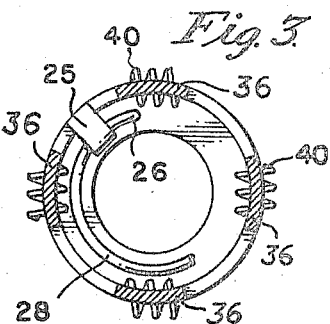
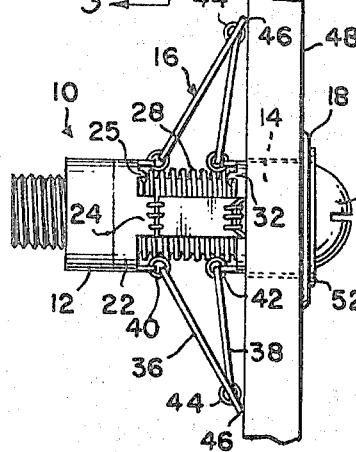
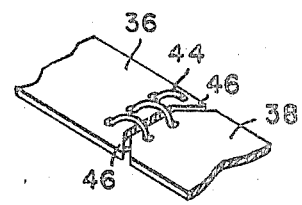
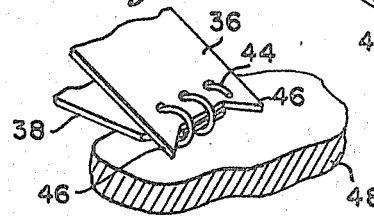
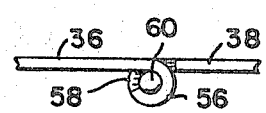
INVENTOR
BERTRAM H. KAPNEK
BY
Caesar, Rivise,
Bernstein & Cohen
ATTORNEYS.

United States Patent Office 3,487,746
Patented Jan. 6, 1970

3,487,746
SCREW ANCHOR
Bertram H. Kapnek, 8106 Douglas Road,
Philadelphia, Pa. 19118
Filed Apr. 1, 1968, Ser. No. 717,772
Int. Cl. F16b 33/04, 21/00, 13/04
U.S. Cl. 85—71                                  9 Claims

ABSTRACT OF THE DISCLOSURE

A screw anchor comprising a plurality of parallel ribs which are pivotally secured to a pair of spaced sleeves. Each rib is formed in two sections with the two sections being pivotally linked. One sleeve is internally threaded for the reception of a screw or bolt. A spring causes the ribs to pivot and be held tightly against the interior of a wall. The anchor can be spread by the insertion of a screw to expand the spring, thereby permitting the withdrawal of the anchor from a hole made in the wall.

---

Screw anchors are in common usage and are used primarily for securing heavy items or items on which a great deal of stress will be placed onto a hollow wall. Generally, the screw anchors in present usage comprise a screw mounted in a metal sleeve which is split longitudinally in the center to form a plurality of parallel ribs. One of the sleeves is internally threaded to receive the screw. The other sleeve has an exterior annular flange which abuts the exterior surface of the wall when the screw anchor has been placed through a hole in the wall.

In use, a hole is drilled in the wall which is smaller in diameter than the outer diameter of the flange of the screw anchor. However, the hole is sufficiently large in diameter to receive the tubular portion of the screw anchor which includes the sleeves at both ends and the intermediate ribs. After the screw anchor has been inserted into the wall, a screw within the anchor is rotated in a clockwise direction. This causes the internally threaded sleeve to be drawn toward the interior surface of the wall. At the same time, the ribs which are formed from a soft metal, such as thin gauge steel, are caused to flare out and bend in the center. Eventually, the ribs will be drawn flush with the interior surface of the wall. The screw is then removed by rotating it in a counterclockwise direction, the item to be mounted is placed against the flange of the anchor, and the screw is then replaced. A solid support for the mounted item is thus obtained because the screw anchor is securely mounted against the wall. Furthermore, the flaring of the ribs spreads the load over a wide area of the wall adjacent the hole which had been drilled.

Screw anchors now enjoy wide use in homes and in industry for mounting fixtures on hollow walls, floors and ceilings. They are furnished in varying diameters to accommodate varying wall thicknesses.

It has been found that one of the major problems of using all of the screw anchors of the aforementioned type which are now in common usage is that there is no efficient way of removing them from a wall after they have been inserted. Thus, once the ribs have been deformed to their flared condition, there is no way of straightening them to return them to their original shape. Thus, the screw anchor cannot easily be removed from the wall. The manner now commonly used for removing the screw anchors, if it becomes necessary to do so, is to break the flanges off the front of the screw anchor and push the remainder of the screw anchor into the wall. This will destroy the screw anchor and will not permit its reuse. Additionally, quite often there is a great deal of damage done to the wall in an attempt to remove the flange of the screw anchor.

The screw anchor of this invention overcomes all of the aforementioned problems of the prior art screw anchors. Thus, the screw anchor of this invention is readily removable from a wall whenever it is desired to remove the same. Furthermore, no damage is done to the wall when it is removed, and the screw anchor can be reused after it has been removed. Continued insertion and removal of the screw anchor will not reduce its effectiveness.

It is therefore an object of this invention to provide a novel screw anchor.

It is another object of this invention to provide a screw anchor which is readily insertable and removable from a wall.

These and other objects of this invention are accomplished by providing a screw anchor comprising a pair of spaced aligned sleeves, a plurality of ribs connecting said sleeves, said ribs being hinged to said sleeves, each of said ribs comprising two sections with said sections being hinged together, and one of said sleeves being internally threaded for reception of a screw.

Other objects and many of the attendant advantages of this invention will be readily appreciated as the same becomes better understood by reference to the following detailed description when considered in connection with the accompanying drawings wherein:

FIG. 1 is a perspective view of the screw anchor of this invention;

FIG. 2 is a sectional view taken along the line 2—2 of FIG. 1;

FIG. 3 is an enlarged sectional view taken along the line 3—3 of FIG. 2;

FIG. 4 is an enlarged sectional view taken along the line 4—4 of FIG. 1;

FIG. 5 is a side elevational view of the screw anchor of this invention mounted on a wall;

FIG. 6 is a partial perspective view of the pivot joint in a rib of the screw anchor of this invention;

FIG. 7 is a partial perspective view similar to FIG. 6 but showing the position of the pivot joint against a wall;

FIG. 8 is a partial perspective view similar to FIG. 6, but showing a modified form of a pivot joint; and FIG. 9 is a side elevational view of the pivot joint of FIG. 8.

Referring now in greater detail to the various figures of the drawings wherein similar reference characters refer to similar parts, a screw anchor embodying the present invention is generally shown at 10 in FIG. 1. Device 10 basically comprises a rear sleeve 12, a forward sleeve 14, a plurality of parallel ribs 16 and a flange 18 formed at the outer lip of sleeve 14.

Rear sleeve 12 is internally threaded, as shown at 20 in FIG. 2. A collar 22 having four lips 24 projecting therefrom is telescoped over and secured to sleeve 12 (FIG. 2) to be integral therewith. A clip 25 (FIG. 4) also projects from collar 22, and secures one end 26 of tension spring 28 therein.

Forward sleeve 14 is hollow and contains no threads. Flange 18 is unitary with the sleeve and extends laterally to each side of sleeve 14 for a distance approximately equal to the diameter of sleeve 14. Sleeve 14 additionally includes four lips 30 which are aligned with lips 24. A clip 32 (FIG. 1) is secured to the other end 34 of tension spring 28.

Each rib 16 comprises a rear strip 36 and a forward strip 38. Each rear strip 36 is linked to an aligned lip 24 by a coiled spring 40 which passes through holes in the lips and strips. Each forward strip 38 is linked to an aligned lip 30 by means of a coiled spring 42. The lips and strips are otherwise separated from each other, and thus are pivotally secured by the coiled springs. Strips 36 and 38 are also pivotally linked by coiled springs 44. As seen in FIG. 6, strip 36 includes a pair of spaced barbs 46 at the end adjacent strip 38.

The screw anchor of this invention is used in basically the same manner as the screw anchors of the prior art. A hole having a diameter slightly larger than the diameter of sleeves 12 and 14 is drilled in a wall. Although this invention is described with respect to using the screw anchor in a wall, it is to be understood that it can be used on any supporting surface such as a wall, a ceiling, a floor, a display board, etc. After the hole has been drilled, an elongated screw is passed through sleeve 14 and threadedly engaged in sleeve 12. The screw anchor 10 will normally be in the collapsed condition generally shown in FIG. 5. Thus, the action of tension spring 28 will draw sleeve 12 toward sleeve 14, and the strips 36 and 38 will be flared outwardly under the action of the spring. Since all of the linkages between the strips and the sleeves are pivot linkages, the strips will move freely to this flared position. Therefore, in order to insert the screw anchor in the wall, the sleeve 12 must be pushed rearwardly by some instrument in order to deform the screw anchor to the shape shown in FIG. 1. This is most conveniently accomplished by inserting a screw or bolt into sleeve 12 and pushing the screw rearwardly to expand spring 28.

After the anchor 10 has been inserted in the wall, pressure against the screw is released. This causes spring 28 to contract, thereby again flaring ribs 16. The contraction continues until the barbs 46 engage a supporting surface, such as wall 48 (FIGS. 5 and 7). As seen in FIG. 5, the spring 28 is not fully contracted in this condition, and therefore the spring aids in holding anchor 10 resiliently in place. Screw 50 is then removed and the fixture to be mounted is placed against flange 18 and in the area of the front opening in sleeve 14. By way of example, a metal plate 52 is shown supported by the screw anchor in FIG. 5. Plate 52 can be secured to any desired hardware used on the wall, such as a picture book. After the plate 52 has been positioned against flange 18, screw 50 is reinserted into screw anchor 10 and threadedly engaged in sleeve 12. Screw 50 is rotated until it is tight, at which position the barbs 46 are firmly engaged in wall 48 and the inturned lip 54 (FIG. 2) of flange 18 firmly engages the outer face of the wall.

To the extent described above, the screw anchor of this invention functions in the same manner as the prior art screw anchors. Thus, the ribs 16 distribute the load over a large area on the back side of the wall. Flange 18 distributes the load over the front or exterior side of the wall. It should be noted, however, that flange 18 is substantially larger than the flanges used in the prior art screw anchors. By having the larger flange, the load bearing capabilities of the wall are greatly increased. In this connection it has been found that where the prior art screw anchors were used on relatively crushable materials, such as wall board, in some instances the front side of the wall would be crushed by the small flange used in the prior art screw anchors. This will not occur when using the larger flange 18.

If the fixture which is mounted on the wall 48 is later removed, and it is not desired to mount another fixture at the same position, the screw anchor of this invention can be removed and reused. In this respect, the screw anchor of this invention differs from those of the prior art. To accomplish this, screw 50 is rotated in a counterclockwise direction until its head is positioned a substantial distance from the front face of wall 48. However, the screw is sufficiently long that while in this position its rear threads will still be engaged in threads 20 of rear sleeve 12. Thus, the head of the screw 50 can be pushed rearwardly to extend the screw anchor to the position shown in FIG. 1. Thereafter flange 18 can be grasped and pulled horizontally outward thereby removing the screw anchor from the wall. The hole formed in the wall can then be sealed over. If desired, the inwardly facing lip 54 on flange 18 need not be present. Therefore, there will be no marks left on the front face of the wall when the screw anchor is removed.

After the screw anchor has been removed, it can be reused an indefinite number of times in the same manner as that described above. Thus, the screw anchor will not be destroyed when it is removed from the wall. This is in contrast to the screw anchors in present usage which must be destroyed in order to remove them from the wall. The facility of removing the screw anchor results from the fact that the ribs 16 are freely pivotally connected to the forward and rear sleeves of the anchor.

A modified embodiment of the pivotal connection of the strips forming ribs 16 of the forward and rear sleeves and to each other is shown in FIGS. 8 and 9. As seen therein, each strip 36 is provided with a pair of spaced barrels 56 at each end. Each strip 38 is provided with a single intermediate barrel 58 at each end. Barrel 58 is received between aligned barrels 56, and the strips 36 and 38 are pivotally connected by a hinge pin 60 which passes through the aligned barrels. A similar type of connection is provided between strips 36 and lips 24 and between strips 38 and lips 30. The same type of freely pivotable connection is accomplished when using the hinge connection of FIGS. 8 and 9 as is accomplished when using the hinge connection shown in FIGS. 6 and 7.

Without further elaboration, the foregoing will so fully illustrate my invention that others may, by applying current or future knowledge, adopt the same for use under various conditions of service.

What is claimed as the invention is:

1. A screw anchor comprising a pair of spaced aligned sleeves, a plurality of ribs connecting said sleeves, said ribs being hinged to said sleeves, each of said ribs comprising two sections with said sections being hinged together, a tension spring secured to said sleeves and extending therebetween, said spring urging said sleeves toward each other, one of said sleeves having a flange thereon, said flange being adapted to abut the outer surface of the item on which said screw anchor is mounted, the other of said sleeves being internally threaded, and a headed screw passing through both of said sleeves and being threadedly received in said other of said sleeves, said headed screw having means thereon for advancing said screw in said threaded sleeve, and said headed screw being slidably received in said one of said sleeves, whereby said screw anchor can be inserted through a hole in the item on which it is to be mounted by elongating said spring by pressure on said headed screw, and said screw anchor is secured to said item by releasing the pressure against said headed screw to permit said spring to contract and urge said ribs against said item.

2. The screw anchor of claim 1 wherein said flange extends outwardly from said sleeve a distance equal to at least the width of said sleeve.

3. The screw anchor of claim 1 wherein said tension spring is positioned within the area bound by said ribs.

4. The screw anchor of claim 3 wherein said tension spring comprises a coiled spring and said screw will pass through said coils when inserted into said screw anchor.

5. The screw anchor of claim 1 wherein said ribs are hinged to said sleeves by coiled springs.

6. The screw anchor of claim 1 wherein said ribs are secured to said sleeves by pivot pins passing through aligned barrels on said ribs and sleeves.

7. The screw anchor of claim 1 wherein said sections are hinged together by coiled springs.

8. The screw anchor of claim 1 wherein said sections are hinged together by pivot pins passing through aligned barrels on said sections.

9. The screw anchor of claim 1 and further including barbs on at least one of said sections, said barbs adapted to engage the interior surface of a wall when said screw anchor is mounted for use on a wall.

References Cited

UNITED STATES PATENTS

| | | | | |
|---|---|---|---|---|
| 330,119 | 11/1885 | Holden | | 85—71 |
| 2,018,251 | 10/1935 | Croessant | | 85—71 |
| 2,236,079 | 3/1941 | Wipper | | 85—71 |
| 2,809,070 | 10/1957 | Nelson | | 85—3 |
| 2,897,694 | 8/1959 | Carney | | 85—3 |
| 3,385,156 | 5/1968 | Polos | | 85—71 |

FOREIGN PATENTS 249,953  10/1966  Austria.

MARION PARSONS, Jr., Primary Examiner

U.S. Cl. X.R.

85—3, 80; 151—41.75